July 14, 1959

H. E. BRANKER 2,895,080

PULSE GENERATOR

Filed May 21, 1958

INVENTOR.
HOFFMAN E. BRANKER
BY
Franz O. Ohlson, Jr.
ATTORNEY

July 14, 1959    H. E. BRANKER    2,895,080
PULSE GENERATOR
Filed May 21, 1958    2 Sheets-Sheet 2
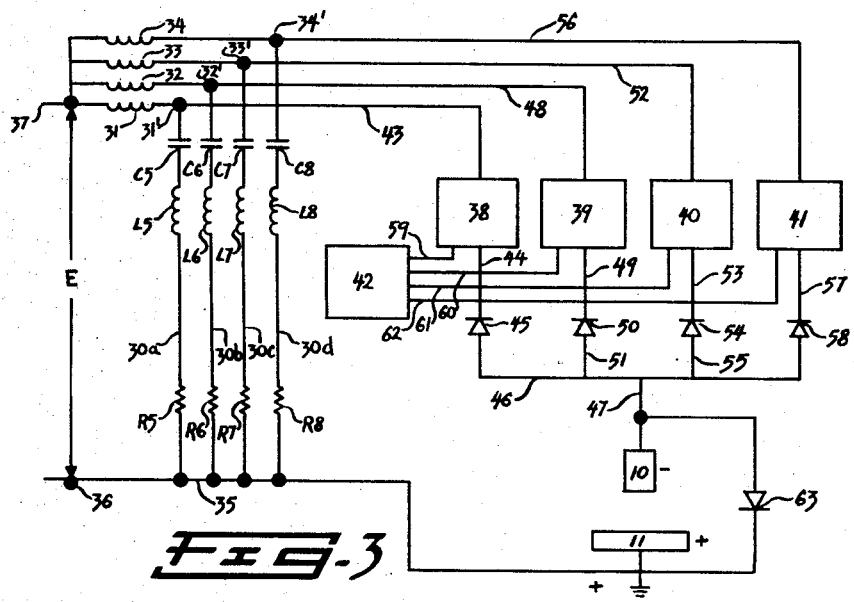
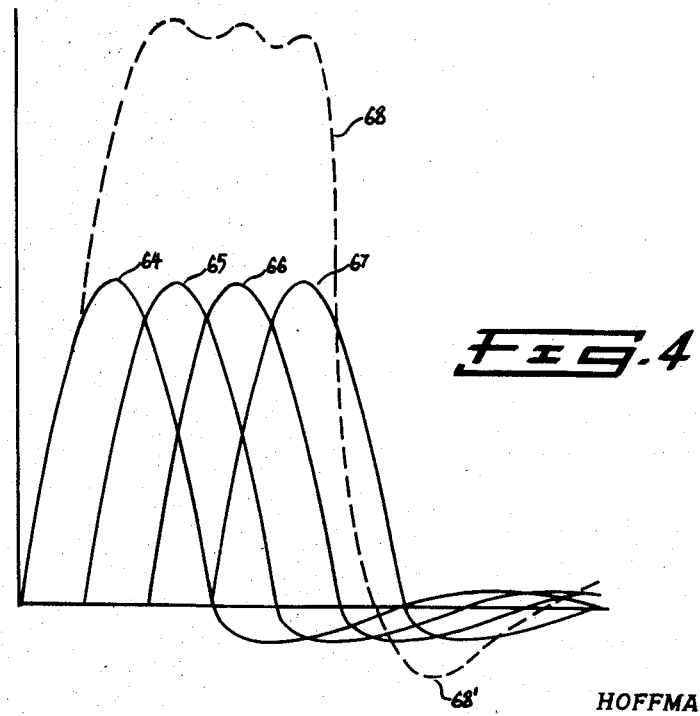
INVENTOR.
HOFFMAN E. BRANKER
BY
Franz O. Ohlson, Jr.
ATTORNEY

United States Patent Office 2,895,080
Patented July 14, 1959

2,895,080

PULSE GENERATOR

Hoffman E. Branker, Merrick, N.Y., assignor to Republic Aviation Corporation, Farmingdale, N.Y., a corporation of Delaware Application May 21, 1958, Serial No. 736,832

13 Claims. (Cl. 315—205)

This invention relates to the generation of electrical current pulses and more particularly to the generation of electrical current pulses of large magnitude.

While the present invention may have general utility, it is particularly adapted for use in electrical discharge machining or electro-shaping processes and equipment where it serves to provide large current pulses between the electrode tool and the workpiece.

In electrical discharge machining, a shaped electrode tool is positioned in spaced relationship to a workpiece to be machined and the gap between the tool and the workpiece is provided with a dielectric of either gas or liquid. Electric power is applied to the tool and workpiece to ionize the material in the gap and produce spark discharges between the tool and workpiece. This action removes metal from the workpiece and shapes the workpiece in accordance with the configuration of the electrode.

In order to produce current flow across the gap it is necessary to produce a voltage differential across the gap sufficient to ionize the gas and produce a conductive path. After ionization the resistance of the gap becomes negligible, and only a relatively low voltage is necessary to create and maintain an arc.

In accordance with practices heretofore used, electrical circuitry is arranged to generate pulses of a voltage and current sufficient to ionize the medium in the gap and produce the desired electrical discharge. It has been found that when an arc or current flow is initiated by means of an energy pulse, oscillatory conditions often occur causing current to flow alternately first in one direction and then the other across the gap. The reversal of current flow across the gap interferes with the machining process and its prevention presents a serious problem.

Oscillatory conditions are produced by reason of the inherent resonant characteristics of the circuits which include both capacitance and inductance and are shock excited by energy pulses. If the resonant circuit had zero resistance, the oscillations would continue indefinitely as there would not be any power loss. However, this ideal condition is not attainable, therefore, the oscillations will gradually decrease in amplitude at a rate generally determined by the resistance in the circut. In the case of high-power devices for generating current pulses of thousands of amperes, the electric conductors, as well as the electrode tool and workpiece, present material inductance even though the resistance is maintained at a low level so that substantial oscillations are encountered following the initial pulse. While the introduction of resistance will cause the oscillations to diminish more rapidly, the resistance that can be used is limited since it also reduces the maximum attainable current that can be produced by the initial pulse.

To overcome the foregoing difficulties, the present invention contemplates an electrical circuit wherein the components are organized and arranged to substantially minimize, if not eliminate, oscillatory conditions and hence the reversal of current through the gap. To this end, the electrical circuitry proposed herein may include a plurality of parallel-connected resonant electrical circuits with each circuit comprising a series-connected capacitor and inductor. The parallel circuits are connected with the electrode tool and workpiece in such a manner that the electrode tool, workpiece and the gap between the tool and workpiece constitute a common current path for each of the individual resonant electrical circuits. Moreover, the proposed circuitry is also organized and arranged to produce a single composite pulse of predetermined amplitude, duration and configuration which simplifies pulse generation, increases the efficiency of the system and minimizes reverse currents or oscillatory modes.

In one form of the electrical circuitry contemplated herein, the plurality of resonant electrical circuits are discharged simultaneously to produce a single composite pulse, while in another form the capacitors are discharged sequentially. In each instance, however, the resultant composite current pulses greatly exceed the magnitudes of the individual pulses and little, if any, reversal of current or an oscillatory mode is experienced.

The invention further contemplates an improved system for use in combination with pulse generating circuits to damp oscillations following the initial arc-producing pulse and overcomes the need for introducing additional resistance. Moreover, this improved damping system when used in spark-machining apparatus functions to by-pass reverse currents that may be produced. Thus, the combined effect of an improved pulse generator having little, if any overshoot or undamped oscillation together with additional means for further damping the system and by-passing reverse currents from the electrode tool and workpiece affords a sequence of current pulses with virtually all effects of current reversals across the gap eliminated.

With the above and other objects in view as will become apparent, the present invention consists in the construction, combination and arrangement of parts, all as hereinafter more fully described, claimed and illustrated in the accompanying drawings, wherein:

Figure 3 is a circuit diagram of another form of the electrical circuitry or pulse generator contemplated herein associated with an electrode tool and workpiece wherein the resonant electrical circuits are discharged sequentially, and Figure 4 is a graph showing in solid line the current in each resonant electrical circuit and in dotted line the sum of these currents as it appears across the gap between the electrode tool and workpiece.

Figure 1:
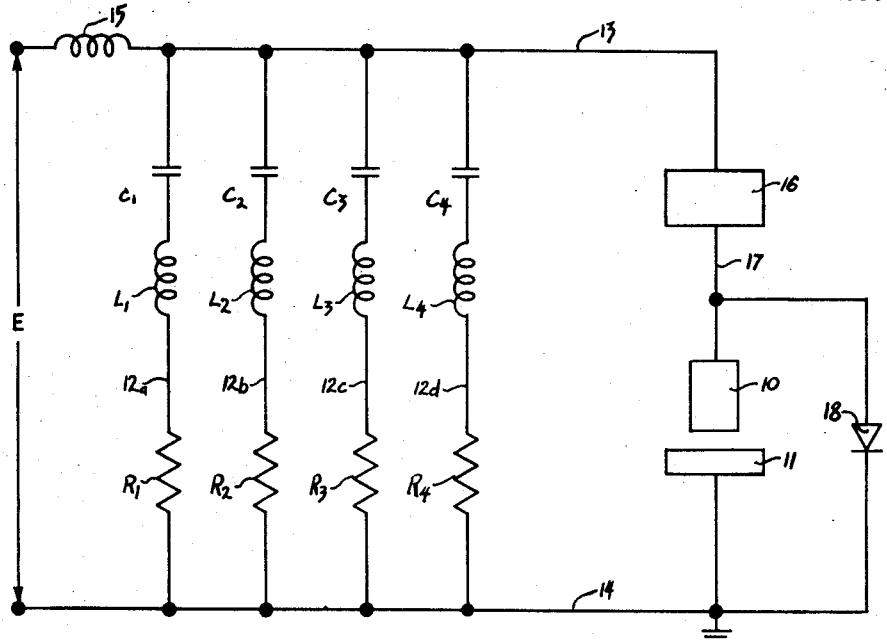
Figure 1 is a circuit diagram of one form of an electrical circuitry of pulse generator associated with an electrode tool and workpiece wherein the resonant electrical circuits are arranged to discharge simultaneously.
Figure 2:
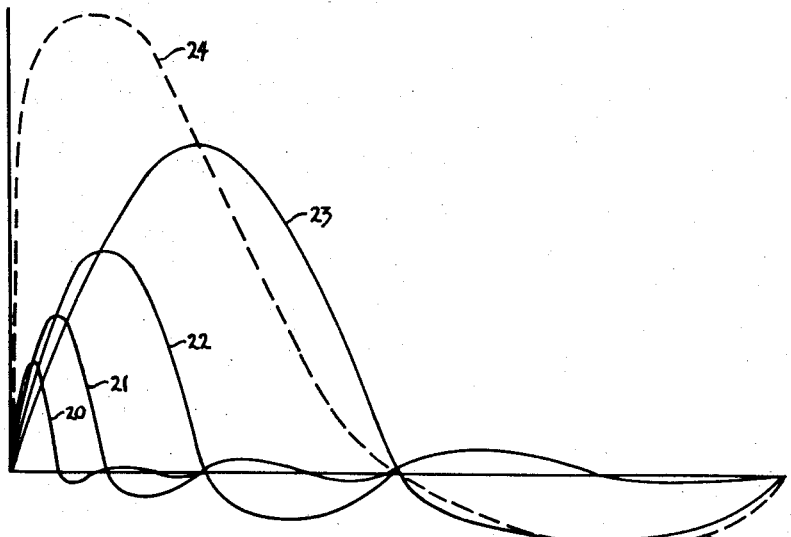
Figure 2 is a graph showing in solid lines the current in each resonant electrical circuit of Figure 1, and in dotted lines the sum of these currents as it appears across the gap between the electrode tool and the workpiece.

Referring now to the drawings and in particular Figures 1 and 2, 10 designates a conventional, electrode tool and 11 a workpiece to be electro-shaped thereby.

The electrical circuitry contemplated herein for providing the desired current pulses between the electrode tool 10 and the workpiece 11 comprises, in this instance, four series resonant electrical circuits each consisting of a capacitor, an inductor and a resistor. The circuits are connected by a common conductor to the electrode tool and workpiece. Means are provided for charging the series resonant circuits, i.e., the capacitors thereof and at least one of the common conductors includes a switching device for simultaneously initiating their discharge.

The resonant circuits are generally denoted by the numerals 12a through 12d and are connected between the common conductors 13 and 14. The circuits include capacitors C1 to C4, inductors L1 to L4 and resistors R1 to R4 and the values of the components of each circuit are selected to produce discharge pulses of a magnitude, shape and duration that will produce a desired composite pulse such as that illustrated, for instance, in dotted outline in Figure 2. In the selection of the components for each circuit, the size of the capacitor determines the total energy stored in the circuit; the inductive reactance controls the rise time of the current pulse; and the resistance determines the rate of decay of circuit oscillations produced by the pulse.

While the inductors and resistors are illustrated in the drawings as discrete elements, it is to be understood that they are intended to represent the lumped and distributive inductive and resistive characteristics of the circuit. For instance, in the generation of high current pulses, straight conductive members have appreciable inductive reactance as well as resistance, and all practical inductors and capacitors must necessarily have some resistance. With reference to the capacitors, the circuits will have little distributed capacitance and accordingly their effects have been neglected.

Charging of the series resonant circuits is effected by applying a D.C. voltage E to the conductors 13 and 14 through a series inductor 15 which, together with the characteristics of the series circuits, controls the charging rate. Other means may be employed to attain the desired charges on the condensers C1 to C4 including A.C. systems, it being merely necessary to effect the charge within the time determined by the pulse width and duty to be employed, the duty cycle being the ratio of the discharge period to the total pulse repetition period.

Discharge of the circuits 12a through 12d across the gap formed by the electrode tool 10 and workpiece 11 is controlled by a normally open timing switch 16 connected at one side to the conductor 13 and at the other side through a conductor 17 to the electrode 10. The workpiece 11, normally maintained at ground potential, is connected to the conductor 14. In order to minimize losses in the transmission of energy to the electrode tool 10 and workpiece 11, it is important to maintain the impedance of the conductors 13, 14 and 17 and the switching means 16 as low as possible. The switching means 16, which may be either mechanical or electronic, is preferably closed automatically and at periodic intervals determined by the selected duty cycle and pulse repetition rate. A rectifier 18 is connected between the electrode 10 and the workpiece 11 and functions to by-pass currents flowing through the circuit in a direction opposite to that of the initial pulse. This action prevents reverse currents in the gap and adverse effects on the machining process.

The operation of the circuit described above will be more clearly understood by reference to the graph shown in Figure 2. In this figure the pulses of energy delivered by each series network 12a through 12d to the electrode tool 10 and workpiece 11 are illustrated by the curves in solid lines and denoted by the numerals 20 through 23 inclusive. The composite current pulse, in dotted outline and denoted by numeral 24, is the sum of the individual pulses 20 through 23.

It will be observed that in the illustrated embodiment of the invention, each individual current pulse 20 through 23 has substantial overshoot and the rise time is relatively slow. Through a novel combination of the pulses 20 through 23, however, the resultant composite curve 24 has much steeper front, to effect almost instant ionization of the gap between the electrode and workpiece, and a substantial width which indicates delivery of power for a relatively long period of time. Minimum overshoot or current reversal has been attained by combining pulses having different durations so that the overshoot of at least certain of the pulses will be cancelled by pulses of longer discharge rates. For instance, it will be observed that the undamped oscillations of the individual pulses 20 and 21 are completely cancelled and the first negative overshoot of pulse 22 shown below the abscissa or time axis is also cancelled. The successive positive half cycle of pulse 22 functions to reduce a portion of the overshoot of the pulse 23 and, as a result, the composite overshoot 24' of the composite pulse 24 is small in comparison to the magnitude of the pulse 24. Assuming that the curves 20 to 23 are produced by the circuits 12a to 12d, respectively, the illustrated pulse configurations are attained by making condenser C1 small and condensers C2 to C4 progressively larger. The inductors L1 to L4 are adjusted to provide the desired pulse configurations as illustrated, and the resistors function to increase the rate of decay of the oscillations resulting from the initial pulse.

The combination of the four pulses 20 to 23 produce an improved composite and when this arrangement is used with the rectifier 18 shown in Figure 1 adverse effects of reversal of current through the gap between the electrode 10 and workpiece 11 are eliminated. In attaining this end the rectifier performs two functions in that it by-passes reverse currents to prevent them from flowing across the gap and also conserves power by returning a charge to the capacitor with less attenuation. While the specific combination of pulses illustrated in Figure 2 has been found desirable for electro-shaping, other combinations of pulses may be used to produce composite pulses of different configurations that may be required for other types of apparatus. In any event, the utilization of individual pulses to form a single composite pulse greatly facilitates the generation of a highly damped composite pulse without the need for excessive circuit resistance.

A modified embodiment of the invention is shown in Figure 3 wherein a plurality of series resonant circuits are discharged sequentially to obtain a large current pulse with minimum overshoot or reversal of current. In this instance, the series resonant circuits are denoted by the numerals 30a through 30d and include condensers C5 to C8, inductors L5 to L8 and resistors R5 to R8.

The series resonant circuits 30a to 30d in this embodiment of the invention are arranged for discharge sequentially across the tool 10 and workpiece 11 and may be charged from a single source of direct current E through individual inductors 31 through 34, inclusive. The lower end terminal of each of the resonant circuits 30a to 30d is connected to a common conductor 35, the latter being in turn connected to the workpiece 11 and to an input or charging terminal 36. The input terminal 37 is connected to the upper end terminal 31' through 34' of the resonant circuits 30a to 30d through inductors 31, 32, 33 and 34. The inductors 31 through 34 not only influence the charging rate of the condensers C5 through C8 in the manner previously described in connection with Figure 1, but at the same time function to isolate the several resonant circuits.

Discharge of the resonant circuits 30a through 30d across the gap formed between the electrode tool 10 and the workpiece 11 is accomplished by individual mechanical or electronic switching means 38 through 41 controlled by suitable timing means 42. More specifically, the terminal 31' of the network or series resonant circuit 30a is connected through a low impedance conductor 43 to the switch 38 and thence through a conductor 44, rectifier 45 and the conductors 46 and 47 to the electrode tool 10. Similarly, the upper terminal 32' of the resonant circuit 30b is connected to the tool by means of the conductor 48, switch 39, rectifier 50 and conductors 51, 46 and 47. The discharge path for the resonant circuit 30c is terminal 33', conductor 52, switch 40, conductor 53, rectifier 54, and conductors 55, 46 and 47, and the path for circuit 30d is terminal 34', conductor 56, switch 41, conductor 57, rectifier 58 and conductors 46 and 47. The rectifiers 45, 50, 54 and 58 are polarized to conduct during the initial pulse produced by its associated resonant circuit and prevent short circuiting of one resonant circuit by the others.

Sequential control of the switches 38 through 41 is effected by the timer 42 which is suitably interconnected with the switches by conductors 59, 60, 61 and 62. A rectifier 63 is connected between the electrode tool 10 and the workpiece 11 and corresponds essentially to the rectifier 18 shown and described in connection with Figure 1. This rectifier is in a conducting state during reversals of current across the gap and thereby minimizes, if not eliminates, the undesirable effects of oscillatory currents on the machining process and dampens such oscillations.

Figure 4 is a graph illustrating the wave forms of the pulses produced by the networks 30a through 30d, inclusive, and these pulses, in solid outline, are denoted generally by the numerals 64 through 67, inclusive. The composite pulse produced by the sequential discharge of the four resonant circuits is illustrated in dotted outline and denoted by the numeral 68.

It will be observed that in this embodiment of the invention the four current pulses 64 through 67 are substantially identical, with the result that the characteristics of the four series resonant circuits 30a through 30d would also be identical. As in the case of the previous embodiment of the invention, the configurations of the current pulses, including magnitude and duration are determined by the values of the components of each circuit.

The timing switch 42 is operated to close the switches 38 to 41 in sequence to produce pulse discharges at intervals of slightly less than 90 electrical degrees. With this arrangement the first pulse reaches its maximum amplitude, after the second pulse has been initiated. The resultant or composite pulse 68 is of greater amplitude than any of the individual pulses and this amplitude is substantially maintained until after the final pulse has reached its peak. As in the case of the embodiment of the invention shown and described in connection with Figures 1 and 2, a substantial part of the negative or reverse current portions of the pulses 64 and 65 is cancelled and the resultant overshoot 68' of the composite pulse 68 has an amplitude that is small in proportion to the positive amplitude of the pulse.

Any adverse effect of this overshoot 68' is effectively reduced if not prevented by the utilization of the rectifier 63 connected between the electrode tool 10 and the workpiece 11 and polarized to form a low impedance-conducting path upon current reversal. The rectifier also functions to return power to the capacitor.

With the embodiment of the invention as described above, a plurality of resonant circuits are utilized to provide a series of current pulses that are coordinated to produce a single composite pulse having relatively large amplitude with minimum overshoot or reversal of the current. Moreover, through the utilization of unidirectional current means bridging the electrode and the workpiece, reverse currents are by-passed and the capacitor is recharged in part, therefore conserving power. As in the case of the preceding embodiment of the invention, the configuration of the composite pulse may be modified as desired by selecting individual pulses of appropriate magnitude and durations and discharging them in a predetermined manner.

While only certain embodiments of the invention have been illustrated and described, it is apparent that modifications, alterations and changes may be made without departing from the true scope and spirit thereof.

What is claimed is:

1. In electro-shaping apparatus means for producing pulse discharges comprising a plurality of series resonant circuits each including capacitance and inductance, one of said circuits having the values of capacitance and inductance proportioned to produce a discharge pulse of predetermined amplitude and a relatively large amplitude-duration ratio, the remaining circuits having the values of the capacitance and inductance proportioned to produce successively larger amplitudes and smaller amplitude-duration ratios and means for simultaneously discharging said circuits to produce a single composite pulse.

2. In electro-shaping apparatus means for producing pulse discharges according to claim 1 wherein each circuit includes series resistance.

3. Electro-shaping apparatus comprising a workpiece to be shaped, a shaping electrode spaced from said workpiece, at least two resonant circuits connected effectively between said workpiece and electrode, means for charging said circuits and means for discharging them across the gap between said workpiece and electrode to produce a single composite damped pulse of an amplitude greater than the amplitude of any individual pulse and of a duration at least equal to the duration of at least one individual pulse.

4. Electro-shaping apparatus according to claim 3 including unidirectional current limiting means connected between the workpiece and electrode to permit current flow in one direction between the workpiece and the electrode and bypass current flow in the opposite direction.

5. Electro-shaping apparatus according to claim 3 wherein said charging means periodically charges said circuits and said apparatus includes switch means interconnected with said circuits and operated in synchronism with the charging means to periodically discharge said circuits across the electrode and workpiece.

6. Electro-shaping apparatus comprising a workpiece to be shaped, a shaping electrode spaced from said workpiece, a plurality of series resonant circuits each having capacitance and an inductance, one of said circuits producing a discharge pulse of a predetermined amplitude and duration, and each successive circuit producing pulses of successively larger amplitude and longer durations, means for periodically charging said circuits, conductors connecting said circuits in parallel and to the workpiece and electrode and switch means in circuit with at least one conductor for periodically and simultaneously initiating the discharge of said circuits to produce a single arc between said workpiece and electrode.

7. Electro-shaping apparatus according to claim 6 including a rectifier connected between said workpiece and electrode.

8. Electro-shaping apparatus comprising a workpiece to be shaped, a shaping electrode spaced from said workpiece, at least two substantially identical series resonant circuits, means periodically charging each circuit, means including a switch coupling each circuit to said workpiece and electrode, and means actuating said switches in sequence and in synchronism with the charging means to produce repeated composite pulses of energy forming arcs between the workpiece and the electrode, said composite pulses each having an amplitude and duration exceeding the amplitude and duration of said individual pulses.

9. Electro-shaping apparatus according to claim 8 wherein each coupling means includes a series-connected rectifier.

10. Electro-shaping means according to claim 8 including a rectifier connected between the workpiece and electrode.

11. An electric pulse generator comprising means producing a plurality of individual pulses and means for coordinating said individual pulses in predetermined time sequence to produce a single composite damped pulse of an amplitude exceeding the amplitude of any individual pulse and a duration at least equal to the duration of at least one of said individual pulses.

12. Electro-shaping apparatus comprising a workpiece to be shaped, a shaping electrode spaced from said workpiece, means for producing a plurality of pulses of electrical energy, one of said pulses having a predetermined amplitude and a relatively large amplitude-duration ratio, the remaining pulses having successively larger amplitudes and smaller amplitude-duration ratios and means for simultaneously discharging said pulses across the gap between the workpiece and the electrode to produce a single composite pulse.

13. Electro-shaping apparatus comprising a workpiece to be shaped, a shaping electrode spaced from said workpiece, means for producing at least two pulses of electrical energy to produce a single composite damped pulse of an amplitude greater than the amplitude of any individual pulse and of a duration at least equal to the duration of at least one individual pulse.

References Cited in the file of this patent
UNITED STATES PATENTS

| | | |
|---|---|---|
| 2,235,385 | Rava | Mar. 18, 1941 |
| 2,287,543 | Vang | June 23, 1942 |
| 2,679,619 | Brown et al. | May 25, 1954 |